United States Patent [19]

Gracey

[11] Patent Number: 4,686,751
[45] Date of Patent: Aug. 18, 1987

[54] CARTRIDGE CASE TRIMMER

[76] Inventor: Doyle D. Gracey, P.O. Box 155, Tehachapi, Calif. 93561

[21] Appl. No.: 895,296

[22] Filed: Aug. 11, 1986

[51] Int. Cl.⁴ ......................... B21D 51/54; F42B 3/00
[52] U.S. Cl. ......................................... 29/1.32; 86/10
[58] Field of Search ................... 86/10, 24, 33, 37, 40; 29/1.3, 1.31, 1.32

[56] References Cited

U.S. PATENT DOCUMENTS

| | | | |
|---|---|---|---|
| 1,949 | 5/1865 | Allen . | |
| 351,747 | 11/1886 | Dimon . | |
| 2,321,298 | 6/1943 | Johnson et al. | 29/1.32 |
| 2,383,335 | 8/1945 | Moffitt . | |
| 2,406,170 | 8/1946 | Smiley | 29/1.32 |
| 2,744,307 | 5/1956 | Smiley | 29/1.32 |
| 3,174,390 | 3/1965 | Jacobsen | 29/1.32 |
| 3,199,168 | 8/1965 | Rhine | 29/1.32 |
| 3,274,661 | 9/1966 | Westbrook | 29/1.32 |
| 3,550,482 | 10/1970 | Lee | 29/1.32 |
| 3,555,641 | 1/1971 | Lee | 86/10 |
| 3,818,563 | 6/1974 | Beaulieu | 29/1.32 |
| 3,863,529 | 2/1975 | Bolen | 82/47 |
| 4,325,282 | 4/1982 | Schaenzer | 29/1.32 |
| 4,405,269 | 9/1983 | Hertzler | 408/211 |

Primary Examiner—Howard N. Goldberg
Assistant Examiner—Steven Nichols
Attorney, Agent, or Firm—Kenneth G. Pritchard

[57] ABSTRACT

A trimmer for cartridge cases indexes on the shoulder of the case as established by the resizing die and permits a rotating cutter assembly to trim the neck of cases from the inside at a controllable angle. The cutter assembly includes a cutter with a cutting edge for length, a cutting edge for inside chamfer, and an outside deburring edge. There are two alternate embodiments of the invention, one allows for the device to be assembled from several pieces while the other has as many portions as possible cast or machined into a single item.

15 Claims, 5 Drawing Figures

CARTRIDGE CASE TRIMMER

BACKGROUND OF THE INVENTION

1. Field of the Invention

This invention relates to devices which resize and re-dimension spent cartridge cases, including deburring and reaming and cleaning of the cartridge case. Specifically, this invention pertains to cartridge case trimmers that trim the neck of cartridge cases by indexing on the shoulder of the case as established by the resizing die.

2. Description of Prior Art

There are numerous machines which recycle spent cartridge cases and permit them to be reused. When a cartridge is fired, the case expands, the diameter of the case is increased, because of the internal pressure. To reuse, it is common to run the cartridge case through a die to do a full body resize. When the body of the cartridge case is returned to its original size, the added size from the stretched metal is converted into extra length of the cartridge caseneck. In particular, the distance between the shoulder and mouth lengthens. It is common for 0.006 inches to 0.015 inches in length to be added. The excess length is removed based on the overall length of the cartridge measured from the cartridge head.

Current devices, such as rotating cutters, are brought to a fixed case. This usually leaves burrs on the inner and outer edges which are removed with a deburring tool. This in turn leaves a chamfer on the outer edge which may be a safety hazard. A case which has been trimmed too long and chamfered may be forced into the barrel of the weapon. When this is done, the chamfer acts as a forcing cone or collet and excess pressure will occur.

There are no known devices which index on the shoulder of the case as established by the resizing die. All known devices index on the head of the cartridge. Accordingly, it is a object of the present invention to resize the length of the neck and trim the mouth of cartridge cases by indexing on the shoulder of the case as established by the resizing die. Cutting stops automatically when the shoulder reaches a preset location.

SUMMARY OF THE INVENTION

In one embodiment of this invention, a base is formed to have a bearing housing and case holder housing. The bearing housing supports a shaft. The shaft has a crank or motor at one end and a cutter mounted to the opposite end of the shaft. The case holder has a shoulder stop for cartridge cases inserted into said case holder from the opposite side of said case holder from said cutter. When the shaft is rotated either by hand crank or other power source, a cartridge case to be trimmed is inserted, mouth end first, into the far side of the case holder until stopped by the shoulder stop of the case holder.

This invention has an alternate embodiment with a base with an adjustable mount for a case holder housing. The case holder housing provides a mount for a case holder. The adjustable mount is moved to different distances from the bearing housing, shaft and cutter to adjust for different case neck lengths.

In both embodiments, the cutter includes a deburring portion that deburrs the cartridge case inside and out as it is trimmed.

DESCRIPTION OF THE PREFERRED EMBODIMENT

Figure 1:
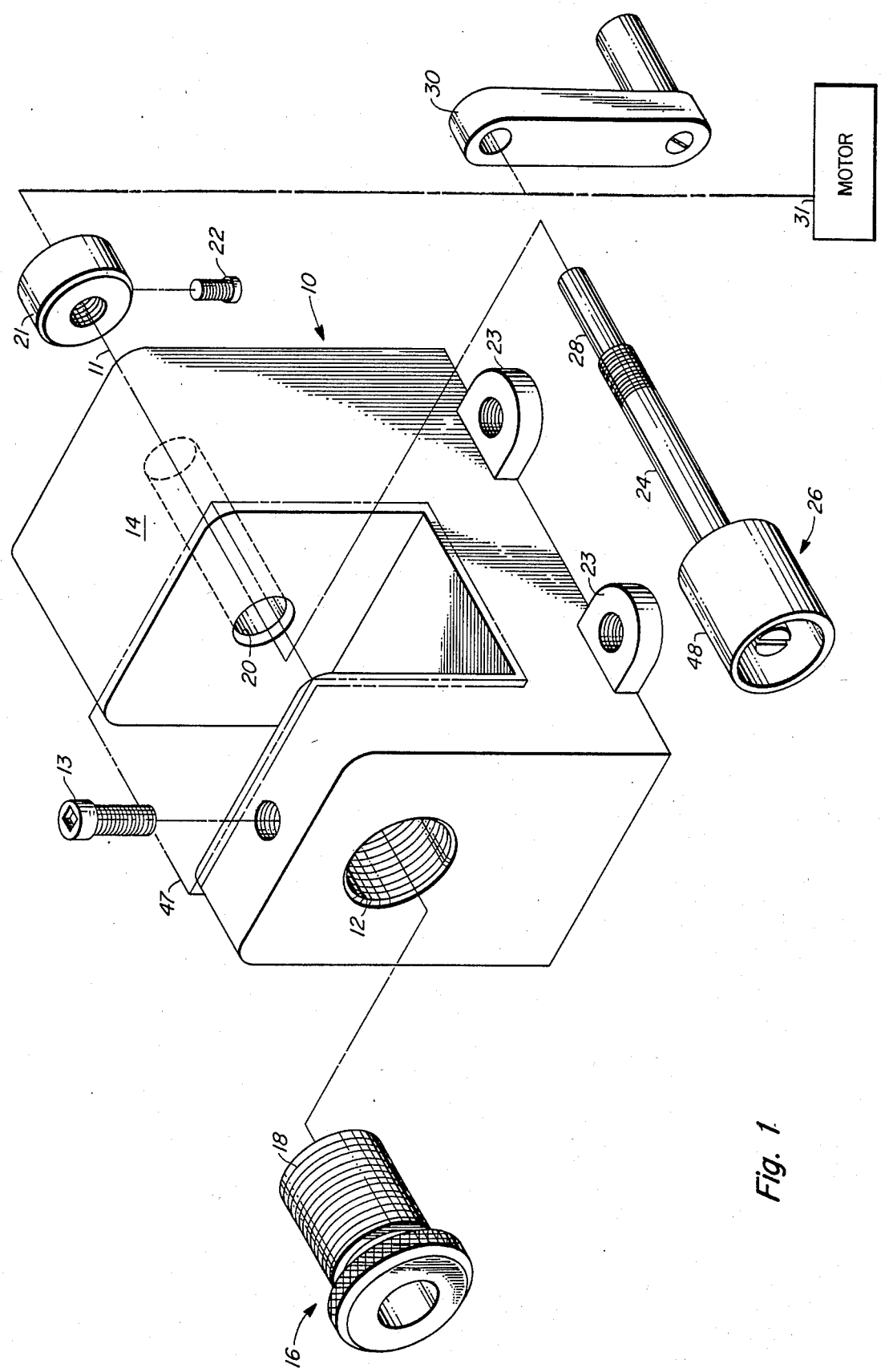
FIG. 1 is a disassembled perspective view of the present invention.

In FIG. 1, a cartridge case trimmer is shown with a block 10 of cast or machined metal such as aluminum. Block 10 is formed to have a cartridge case holder housing 12 which is axially aligned with a bearing housing 14 along axis 11 as shown. Within case holder housing 12, a case holder 16 is mounted, possibly by threads 18 shown or any other suitable method which provides a firm hold on case holder 16. One way to lock case holder 16 in position is with a set screw 13. Threads 18 also permit case holder 16 to be set at an exact position. Within bearing housing 14 a bearing 20 is mounted in any of the known ways to mount a bearing. A shaft 24 is mounted within bearing 20 and held in place by a shaft retainer 21 via set screw 22, such that it is free to rotate. Shaft retainer 21 may be changed for any means for holding shaft 24 in place. As shaft 24 wears within 20, adjusting shaft retainer 21 forward will maintain a snug fit. If shaft 24 is harder than bearing 20, it is bearing 20 that wears away. Block 10 has ears 23 for bench bolts, not shown. Ears 23 may be shaped as desired. Ears 23 allow block 10 to be rigidly mounted to a bench or other working platform, also not shown.

Shaft 24 has a cutter assembly 26 on one end and an end 28 which is on the opposite side of bearing 20 when shaft 24 is mounted in bearing 20. Handle 30, as shown, is a hand crank to rotate cutter assembly 26 via end 28 and shaft 24. A motor 31, driving end 28 through any known means, may also be used to rotate cutter assembly 26. Motor 31 may be any power drive. End 28 may be sized so that it may be driven by an electric drill where end 28 is inserted into the drill chuck instead of a drill bit. Motor 31 and hand crank 30 are merely examples of means for turning shaft 24. The void between bearing housing 14 and case holder housing 12 may be covered by a clear plastic cover 47. Cover 47 prevents injury to users caused by small chips of metal thrown by cutter assembly 26.

Figure 2:
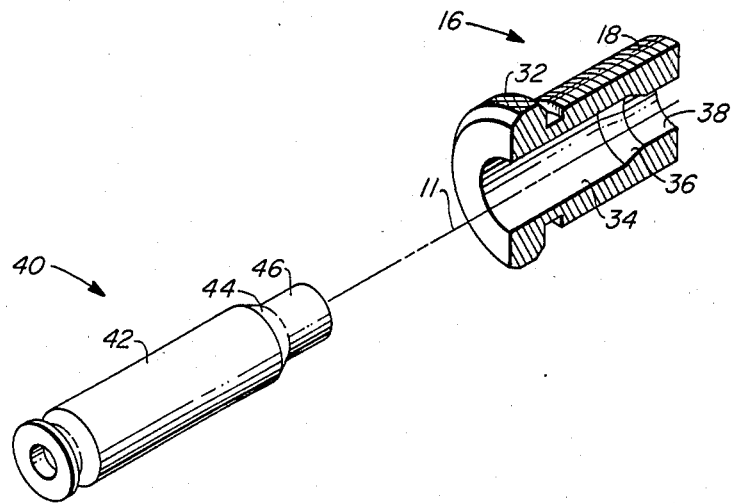
FIG. 2 is cut away view of a case holder of the present invention.

FIG. 2 is a cross-sectional view of case holder 16. In addition to mounting threads 18, a knurled surface grip 32 may be added for ease in screwing case holder 16 into or out of case holder housing 12. Along axis 11, case holder 16 has an opening which is shaped to match a given cartridge case's external dimensions. A typical cartridge case 40 is shown. Cartridge case 40 has a main body 42 which is tapered and fits within tapered opening 34 of case holder 16. The length of opening 34 should be sufficiently shorter than body 42 so that enough of cartridge case 40 extends to hold by hand. For example, if the length of opening 34 is one third of the length of body 42, there is adequate length to grip. Shoulder 44 is stopped by a mating surface 36. Thus mating surface 36 is a shoulder stop for cartridge case 40. Neck 46 extends through opening 38. The length of neck 46 is set by indexing on the shoulder of the cartridge case as established by the resizing die, not shown. Opening 34 is tapered to fit resizing cases. An un-resized case will not fit into opening 34. This serves as a safety check which prevents the mistake of trimming an un-resized case.

Figure 3:
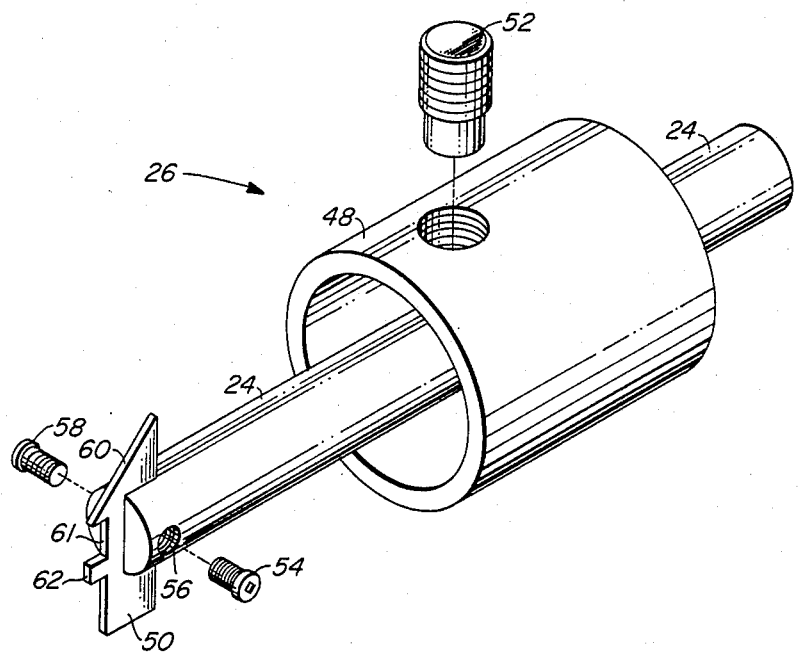
FIG. 3 is a disassembled view of a cutter assembly for the present invention.

FIG. 3 is a disassembled view of cutter assembly 26. Mounted to shaft 24 is a guard 48, shown in FIG. 1, which serves to stop any metal slivers that the cutter 50 may create. Guard 48 may be attached by a set screw 52 to shaft 24. As shown, the cutter 50 is mounted on the end of shaft 24 via a set screw 54 and 58. Guard 48 is placed over cutter 50 and secured in place by set screw 52. Cover 47 as described in FIG. 1 is a substitute for guard 48.

Figure 4:
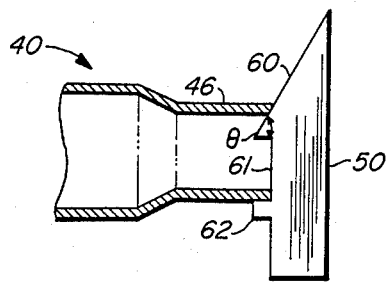
FIG. 4 shows the cutter used in the present invention.

In FIG. 4 a cross-section of cartridge case 40 shows the relationship between the surfaces of cutter 50 and neck 46 of case 40. Cutter 50 has a cutting edge 60 to give an inside chamferm, a cutting edge 61 to cut to length and a deburring edge 62. Cutting edge 60, as it rotates, shaves the end of neck 46 from the inside of cartridge case 40. Cutting edge 61 cuts neck 46 to the exact length required based on the required distance fixed between cutting edge 61 and mating surface 36 of case holder 16. Deburring edge 62 rotates at the same time about the outside of neck 46 and removes any burs or defects on the outside of the neck 46. The angle O of cutting edge 60 may be made at any angle desired to leave a chamferred surface on the inner surface of neck 46. The rotation of cutting edge 61 leaves the end of neck 46 with a clean 90 cut across the major axis of cartridge case 40.

Figure 5:
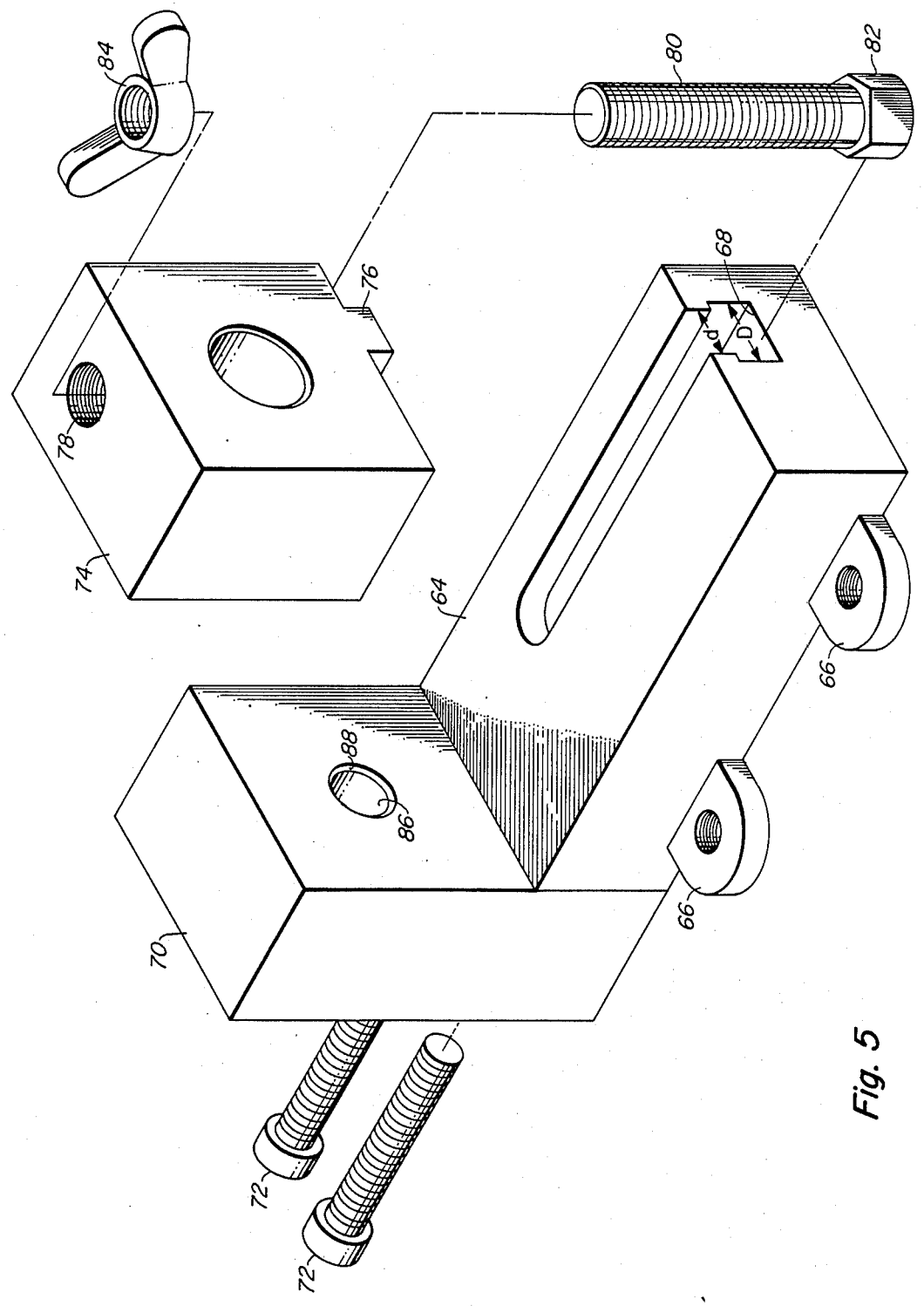
FIG. 5 is a disassembled view of an alternate embodiment of the present invention.

In FIG. 5 an alternative for making a cartridge case trimmer is shown comprising a base 64 which is cast or machined from a suitable material, such as aluminum. As a matter of convenience, base 64 should include ears 66 for bench bolts, not shown. Ears 66 allow base 64 to be rigidly mounted to a bench or other working platform, not shown. Ears 66 may be shaped as desired. Within base 64 is a keyway 68 which has a wider dimension, D, within base 64 than opening dimension, d. A bearing housing 70 is mounted to base 64 by screws 72 or other suitable attachment.

A case holder housing 74 with an extension 76 of width, d, on the bottom of case holder housing 74 fits over base 64 so that extension 76 fits into keyway 68 and may be slid along keyway 68. Case holder housing 74 has an opening 78 which permits a bolt 80 to be placed through bearing housing 74. Bolt 80 has a head 82 which fits within keyway 68 such that head 82 has a width less than D but greater than d. A wingnut 84 is screwed onto bolt 80 where it extends through the top of case holder housing 74. Tightening of wingnut 84 draws head 82 against the lip formed by the differences in dimensions D and d of keyway 68. This locks case holder housing 74 to a specific location on base 64. A case holder 16 fits within case holder housing 74 as previously described. A set screw can be used to lock case holder 16 in place as previously shown.

Through bearing housing 70 is an opening 86 within which is mounted a bearing 88 similar to bearing 20 previously described. Shaft 24 and so forth are mounted within bearing 88. Bearing 88 may be any suitable commercially available bushing or plain gear. Bearing housing 70 may be rigidly mounted by screws 72 as shown or base 64 and bearing housing 70 can be cast as a single item.

When a cartridge case 40 is inserted into case holder 16, cartridge case 40 is inserted until the shoulder of cartridge case 40 makes contact with mating surface 36. With case holder 16 and case holder housing 74 rigidly fixed with respect to base 64, wingnut 84 allows the shoulder stop to be placed a predetermined distance from the end of cutter 50 which is rotatably mounted within bearing housing 70. This distance may be exactly set by using a previously sized and trimmed cartridge case or any commercially available gauge.

What is claimed is:

1. A trimmer for cartridge cases comprising:
   a base;
   a bearing housing mounted to said base;
   a shaft inserted into said bearing housing;
   means for holding said shaft within said bearing housing attached to said shaft;
   a cutter assembly mounted to said shaft, said cutter assembly further comprising a cutter with a first cutting edge for an inside chamber, a second cutting edge for length and a deburring edge which make three distinct cuts on the mouth of said cartridge case;
   a case holder housing mounted to said base with an opening axially aligned with said shaft;
   a cartridge case holder mounted within said case holder housing with an opening shaped to match said cartridge case's external dimensions and a shoulder stop for indexing on the shoulder of said cartridge case; and
   means for turning said shaft.

2. A trimmer for cartridge cases as described in claim 1 where said cutter assembly further comprises
   a guard mounted to catch any shavings thrown off by said cutter.

3. A trimmer for cartridge cases as described in claim 1 where said turning means is a hand crank.

4. A trimmer for cartridge cases as described in claim 2 where said turning means is a hand crank.

5. A trimmer for cartridge cases as described in claim 1 where said turning means comprises a motor.

6. A trimmer for cartridge cases as described in claim 2 where said turning means comprises a motor.

7. A trimmer for cartridge cases as described in claim 1 further comprising a keyway in said base which is fitted to the bottom of said case holder housing and means for locking said case holder housing along said keyway in said base at any location desired.

8. A trimmer for cartridge cases as described in claim 2 further comprising a keyway in said base which is fitted to the bottom of said case holder housing and means for locking said case holder housing along said keyway in said base at any location desired.

9. A trimmer for cartridge cases as described in claim 3 further comprising a keyway in said base which is fitted to the bottom of said case holder housing and means for locking said case holder housing along said keyway in said base at any locations desired.

10. A trimmer for cartridge cases as described in claim 4 further comprising a keyway in said base which is fitted to the bottom of said case holder housing and means for locking said case holder housing along said keyway in said base at any location desired.

11. A trimmer for cartridge cases as described in claim 5 further comprising a keyway in said base which is fitted to the bottom of said case holder housing and means for locking said case holder housing along said keyway in said base at any location desired.

12. A trimmer for cartridge cases as described in claim 6 further comprising a keyway in said base which is fitted to the bottom of said case holder housing and means for locking said case holder housing along said keyway in said base at any location desired.

13. A trimmer for cartridge cases as described in claim 2 where said guard comprises a cylindrical guard mounted on said shaft so as to enclose said cutter.

14. A trimmer for cartridge cases as described in claim 2 where said guard comprises a cover which encloses the space between said bearing housing and said case holder housing.

15. A method of trimming cartridge cases having a head, mouth, and shoulder comprising the steps of:
  A. mounting a cutter assembly on a shaft with an axis at a predetermined location, said cutter assembly further comprising a first cutting edge for an inside chamfer, a second cutting edge for length and a deburring edge;
  B. axially aligning a case holder with a case shoulder stop with said cutter assembly;
  C. locking said case holder with a case shoulder stop in alignment with said aligned cartridge case at a predetermined distance between said case holder and said cutter;
  D. rotating said shaft and cutter assembly about said axis; and
  E. inserting a cartridge case to be trimmed into said case holder until said case holder's shoulder stop is reached.

* * * * *